Oct. 3, 1972   TADAO KATUTA   3,695,860

APPARATUS FOR EMBEDDING METAL PINS IN A GLASS PANEL

Filed July 22, 1970   4 Sheets-Sheet 1

Tadao Katuta
INVENTOR.

BY George B. Oujevolk
Attorney

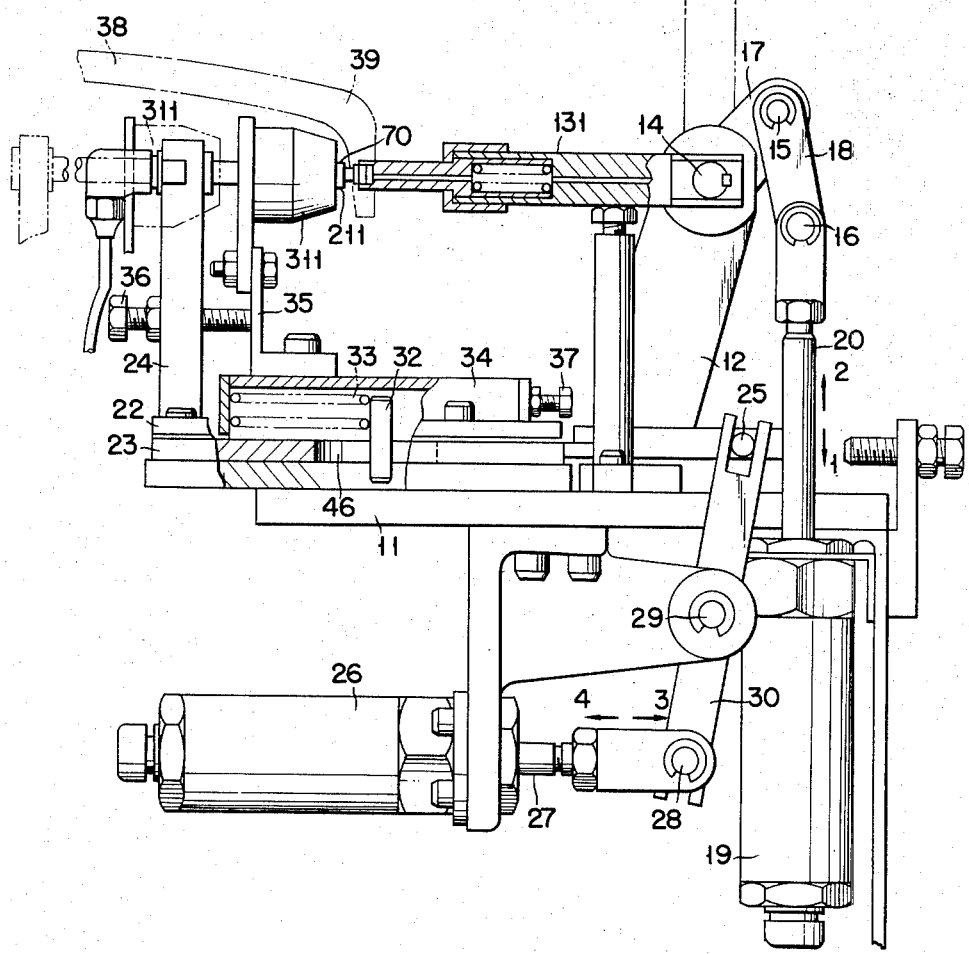
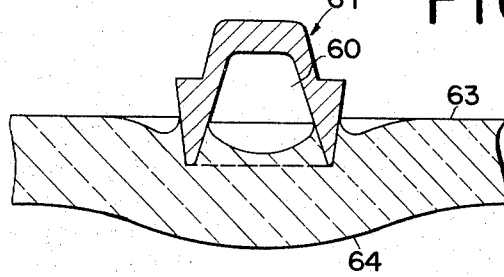

Oct. 3, 1972 TADAO KATUTA 3,695,860
APPARATUS FOR EMBEDDING METAL PINS IN A GLASS PANEL
Filed July 22, 1970 4 Sheets-Sheet 3
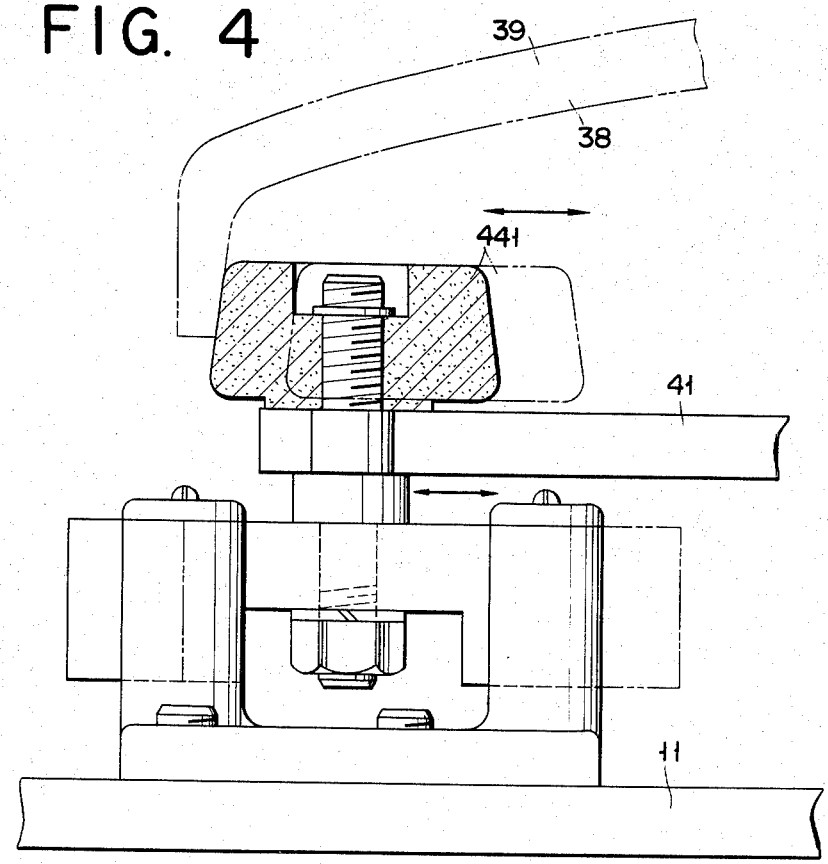
FIG. 4
FIG. 5
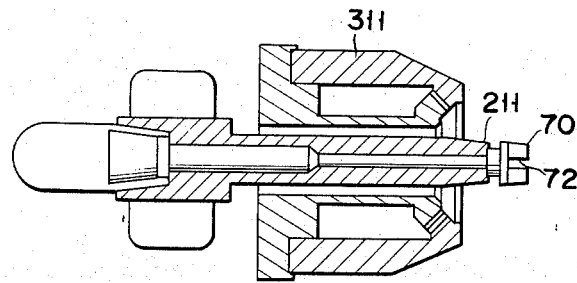
Tadao Katuta
INVENTOR.
BY George B. Oujevolk
Attorney United States Patent Office 3,695,860
Patented Oct. 3, 1972

3,695,860
APPARATUS FOR EMBEDDING METAL PINS IN A GLASS PANEL
Tadao Katuta, Yokohama, Japan, assignor to Tokyo Shibaura Electric Co., Ltd., Kawasaki-shi, Japan
Filed July 22, 1970, Ser. No. 57,113
Int. Cl. C03c 27/02
U.S. Cl. 65—154
10 Claims

ABSTRACT OF THE DISCLOSURE

An apparatus for embedding metal pins in a glass panel having a base frame on the surface of which is performed the work of embedding one end of metal pins for fitting other members by the opposite end thereof in the inner wall of a glass panel having a skirt portion formed substantially vertically around its outer peripheral surface. A plurality of first pin chuck means selectively rotatable to lie substantially in a predetermined horizontal position and other positions respectively outwardly of a setting portion on the base frame of the glass panel, are positioned so as to securely carry each one end of a metal pin by subjecting the forward ends thereof to selective energization by a vacuum source. A plurality of second pin chuck means are provided, and, when each first pin chuck means is rotated to the horizontal position, the second pin chuck means are capable of receiving and securely carrying the opposite end of each metal pin from each first pin chuck means by subjecting the forward ends thereof to selective energization by the vacuum source, the opposite end being mounted by the other members, and which are movable in back and forth directions. A plurality of heating sources are also provided about the forward end of each second pin chuck means.

This invention relates to an apparatus for embedding metal pins in a glass panel, and more particularly to an apparatus suitable for embedding metal pins in the glass panel so as to attach a shadow mask to the glass panel involved in a shadow mask type color television cathode-ray tube.

The glass panel of a shadow mask type color television cathode-ray tube to which the invention appertains is usually of a size suited to the required area of a picture screen, and constitutes the relatively flat front face of a highly evacuated sealed tube envelope. It is almost rectangular, and includes substantially perpendicular, slightly flared peripheral side wall constituting a skirt section. Several (usually 3 or 4) metal pins for the attachment of a shadow mask to the glass panel are embedded in the skirt section at suitable inside positions thereof.

As is well known in the art, at the actual attachment of the shadow mask to the glass panel on the inside of the skirt section an extreme mechanical force is concentrated on the metal pins embedded in the glass panel skirt section, and usually a shadow mask is replaced (the replacement is also made in the repair of the tube) in order to dispose the shadow mask at a precise distance from the front face of the glass panel. At the attachment portion of the shadow mask cracks tend to occur locally in the glass panel in which the metal pins are embedded, so the metal pins should be embedded firmly.

The embedding of the metal pins in the glass panel for the shadow mask type color television cathode-ray tube has heretofore been carried out from place to place mostly by manual operation, which is not only inefficient but also leads to irregularities in the position and strength of the metal pin attached, frequently resulting in the aforementioned cracks.

The invention has been accomplished in view of the foregoing situation, and is intended to provide a novel apparatus for embedding metal pins in a glass panel, which enables a plurality of metal pins to be embedded automatically and with extreme precision in the skirt section of the glass panel for shadow mask type color television cathode-ray tube and prominently elevates the mechanical strength of embedded metal pins by allowing them to assume a special configuration.

This invention can be more fully understood from the following detailed description when taken in connection with reference to the accompanying drawings, in which:

FIG. 2 is a side view, partly broken away, showing part of the mechanism for embedding a metal pin in a glass panel and the mechanism for the transfer of the metal pin of the apparatus of FIG. 1;

FIGS. 3 and 4 represent in enlargement the concrete arrangement of a ring cam mechanism involved in the apparatus of FIG. 1, the former showing its plan view and the latter its side view, partly broken away;

FIG. 5 is an enlarged longitudinal sectional view showing the concrete arrangement of a ring burner for preheating a metal pin and heating a portion of a glass panel, in which the metal pin is to be embedded, and a metal pin chuck for holding the metal pin when it is embedded in the glass panel of the apparatus of FIG. 1.

FIG. 6 is a fragmentary longitudinal sectional view of a glass panel for a shadow mask type color television cathode-ray tube having a conventional metal pin embedded;

The invention will now be described in conjunction with a preferred embodiment thereof with reference to the accompanying drawings.

Figure 1:
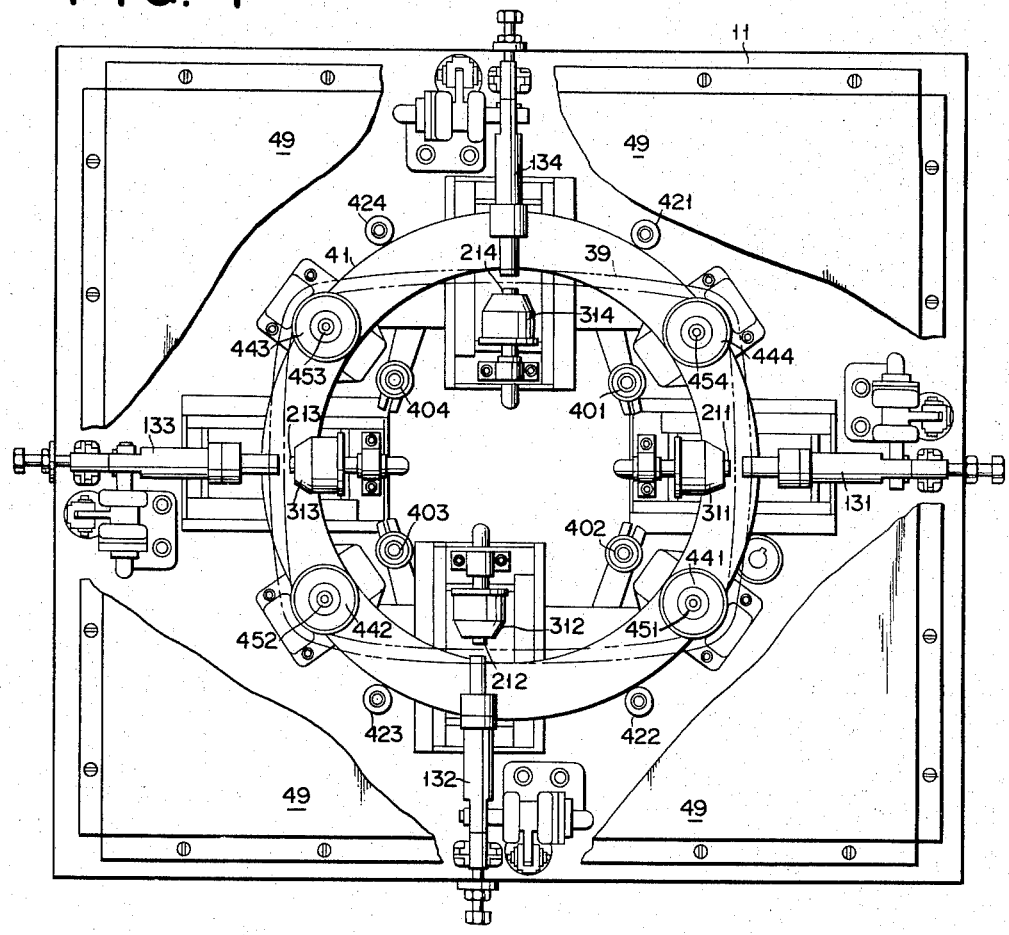
FIG. 1 is a schematic plan view showing the entire construction of an apparatus for embedding metal pins in a glass panel according to a preferred embodiment of the present invention.

Referring now to FIG. 1, there is shown the entire construction of an embodiment of the apparatus comprising a base frame 11, which is rectangular for instance, and has dimensions sufficiently large as compared to the dimensions of a glass panel 39 for a shadow mask type color television cathode-ray tube to be subjected to the operation of embedding metal pins and the glass panel 39 is held substantially in the central position over the base frame 11. To facilitate the description, the apparatus is intended to simultaneously embed 4 metal pins in the middle of and on the inner side of the respective peripheral wall constituting the skirt section substantially at right angles to the screen-forming face plate of the glass panel 39. Supporting members 12, one of which is shown in detail in FIG. 2, are secured to and extend vertically from substantially the center of the four sides of the rectangular base frame 11. Near the top of the supporting members 12 are rotatably mounted respective rods 14, to which are secured respective pin transfer means 131 to 134 each having a bored member to be hereinafter described for the operation and coupled to a vacuum source not shown. The rods 14, with which the respective pin transfer means 131 to 134 rotate, are linked through associated levers 17 and 18 and rods 15 and 16 to piston rods 20 of respective air cylinders 19. Each of the pin transfer means 131 to 134 is rotated with the rod 14 to the vertical position as indicated by broken lines, when the piston rod 20 of the air cylinder 19 is driven in the direction of arrow 1 to the most retracted position, and it is rotated to the substantially horizontal position as indicated by solid lines, when the piston rod 20 of the air cylinder 19 is driven in the direction of arrow 2 to the most advanced position (the figure shows this position). When the pin transfer means 131 to 134 are in the horizontal position of FIG. 2, their free ends face and are aligned with respective pin chucks 211 to 214 each provided with a bored member to be described for the operation hereinafter and coupled to a vacuum source not shown. Each of the pin chucks 211 to 214, one of which, namely pin chuck 211, is shown in detail in FIG. 2, is secured to the top portion of an associated vertical bracket 24 secured to the upper rear portion of an associated pair of tables 22 and 23, which are movable in unison along the upper plate of the base 11 in the longitudinal direction of the associated pin chuck. The tables 22 and 23 are coupled to an associated air cylinder 26 through a lever 30 pivoted at substantially the center of a fixed fulcrum 29 and slidably engaging at one end with a projection pin 25 provided on the side near the front edge of the tables 22 and 23 and at the other end with a projection pin 28 provided at the edge of a piston rod 27 of the air cylinder 26.

Figure 3:
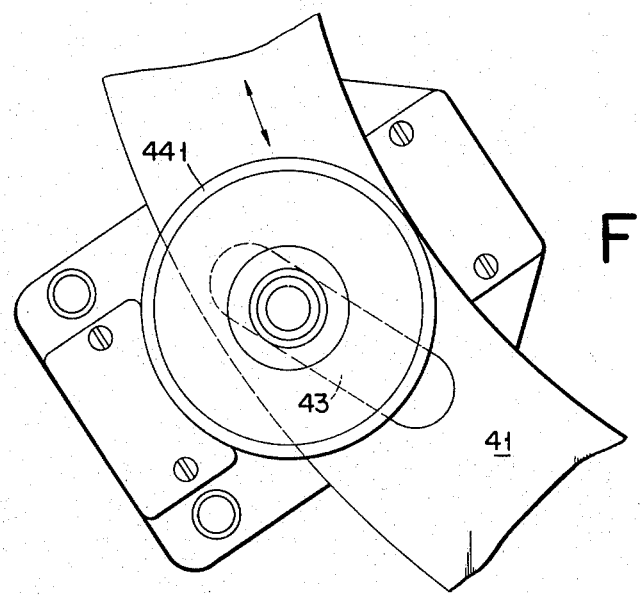
Figure 7A:
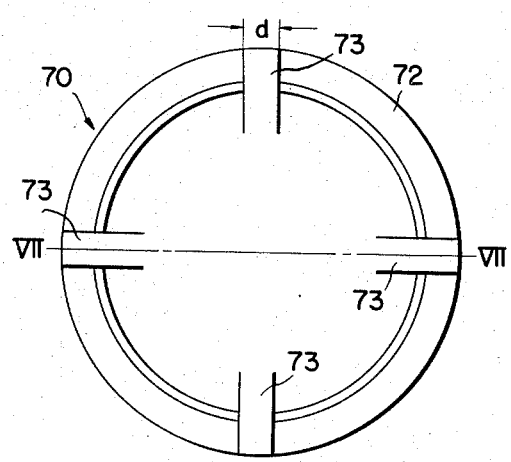
FIG. 7A is a plan view of an example of the glass pin according to the invention.
Figure 7B:
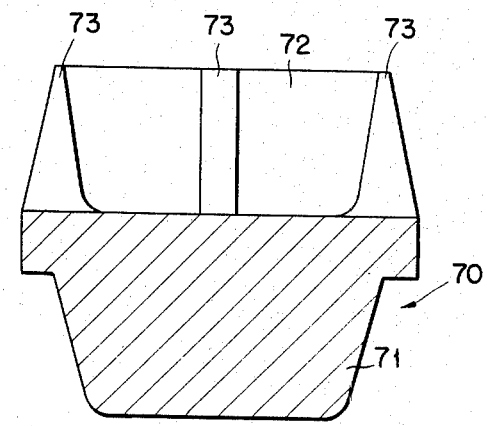
FIG. 7B is a section taken along line VII—VII of FIG. 7A.

Thus, each of the pin chucks 211 to 214 is driven to a position (indicated by broken lines in the figure) farthest from the associated pin transfer means, when the piston rod 27 of the air cylinder 26 is driven in the direction of arrow 3 to the most advanced position, and they are driven to a position (indicated by solid lines in the figure) nearest to the associated pin transfer means, when the piston rod 27 of the air cylinder 26 is driven in the opposite direction of arrow 4 to the most retracted position. As shown in FIG. 5, the pin chucks 211 to 214 (only pin chuck 211 is shown in the figure) are provided with respective concentric ring burners 311 to 314 each having a ring-shaped flame mouth adjacent the front tip of the pin chuck. As shown in FIG. 2, each of the ring burners 311 to 314 (only ring burner 311 is shown in the figure) is secured to an associated vertical bracket 35 secured to a rear portion, adjacent the end nearer to the bracket 24, on the upper side of an associated box-shaped housing 34, which is supported on the associated pair of tables 22 and 23, and is slidable in the same direction as the direction of movement of the tables 22 and 23 through the spring action of compression springs 33 inserted between the rear wall of the housing 34 and a member 32 projecting from the tables 23 through a notch 46 of the tables 22. The stroke of movement of the housing 34 may be finely adjusted in a range determined by a notch or window 46 cut in the upper table 22 by manipulating an adjustment screw 36 penetrating through the bracket 24 and another adjustment screw 37 provided at a suitable position on the front wall of the housing 34. Spaced from and inwardly of the ring burners 311 to 314 are provided respective support rods 401 to 404 provided at the top with, for instance, carbon having a predetermined size meeting the required screen area on which may be supported the glass panel 39 for a shadow mask type color television cathode-ray tube in a horizontal stable position such that the front portion 38 thereof is directed upward and the rear opening is directed downward as shown in dotted line. As carbon has a good heat-resisting property, it will not damage the glass panel when it is in contact with the panel to be described hereinafter. Along a periphery of the corners of the substantially rectangular glass panel 39 when it is set in place is disposed a ring cam 41, which may be rotated, as shown in FIG. 1, either clockwise or counterclockwise by appropriate strokes through a plurality of peripheral gears 421 to 424 meshing with teeth cut in the periphery of the cam 41 and synchronously driven in either clockwise or counterclockwise direction. In those portions of the ring cam 41 which contrast with the inner wall surfaces of a substantially square section where said glass panel 39 is disposed, there are formed symmetrical relationship inclined rectangular penetrating holes 43 one of which is presented in FIGS. 3 and 4, and through said penetrating holes are inserted shafts 451, 452, 453 and 454 movable through said penetrating holes 43. To the upwardly projecting end faces of said shafts, there are integrally fitted in advance press rollers 441, 442, 443 and 444 capable of being pressed, as described later, to the corresponding inner wall surfaces of the aforesaid substantially square section in which the glass panel 39 is provided. Said press rollers 441 to 444 are made of a material, for example, carbon which has good heat resistance and is little likely to damage the glass panel 39.

In the operation of the apparatus of the foregoing construction according to the invention, the pin transfer means 131 to 134 are first brought to the afore-described vertical position as indicated by broken lines in FIG. 2 by driving the respective air cylinders 19. Then, an end of a metal pin of a configuration to be described later is fitted in the tip of each of the metal pin transfer means 131 to 134 in the vertical state, and is firmly attached to the tip by suction brought about through evacuation by operating the respective vacuum sources. Then, the air cylinders 19 are operated again to rotate the pin transfer means 131 to 134 to the substantially horizontal position as indicated by solid lines in FIGS. 1 and 2, while at the same time operating the other air cylinders 26 to bring the pin chucks 211 to 214 from the position indicated by broken lines in FIG. 2 into the position indicated by solid lines in FIGS. 1 and 2. Then the vacuum sources of the pin transfer means 131 to 134 are switched over to the vacuum sources of the pin chucks 211 to 214, so that the metal pins held by suction in the tip of the transfer means 131 to 134 are transferred by suction to the tip of the pin chucks 211 to 214. Afterwards, the pin transfer means 131 to 134 are brought back to the previous vertical position by operating air cylinders 19. Thereafter, the glass panel, which may be preheated, if desired, to a temperature near the softening point (usually about 400° C.), is introduced into the apparatus such that the rear opening thereto is directed downward and the corners of the skirt section thereof engages the corresponding peripheral portions of the carbon pieces 441 to 444, so that the upper ends of the support rods 401 to 404 are in contact with the inner surface of the front portion of the panel 39.

Gears 421 to 424 are then appropriately driven, so that the carbon pieces 441 to 444 may exert high pressure on the corresponding corners of the glass panel 39, thus completing the centering. Then, the pin chucks 211 to 214 and the ring burners 311 to 314 are moved to the positions indicated by broken lines in FIG. 2 by operating the air cylinders 26, followed by sufficiently heating portions of the skirt section of the glass panel 39, in which the metal pins are to be embedded, by the ring burners 311 to 314. When the temperature of the heated portions of the panel 39 is elevated to a point sufficient for the embedding of the metal pins, the air cylinders 26 are operated again, so that only the pin chucks 211 to 214 are advanced from the position shown by broken lines to the position shown by solid lines in FIG. 2. The stroke of the pin chucks 211 to 214 at this time may be adjusted by means of the adjustment screws 36 and 37. As a result, a certain distance between the adjustment screw 36 and the bracket 35 when the pin chuck has been in the position shown by broken lines is covered as the chuck is advanced through the movement of the lever 30, the tables 22 and 23 and the bracket 24. At this stage, the metal pins held by suction in the tip of the chucks 311 to 314 are heated by the respective ring burners 311 to 314 simultaneously with the heating of the portions of the glass panel 39, in which the metal pins are to be embedded. When these portions and the metal pins are heated to respective suitable temperatures, 1100° C. to 1200° C. for these portions and 1000° C. to 1100° C. for the metal pins, the air cylinders 26 are operated once more to advance only the pin chucks 211 to 214 to the foremost position, so that the free end of the metal pin is stuck in the inner wall of the skirt section of the glass panel 39. When the bond between the metal pin and the glass panel is sufficiently consolidated, the ring burners 311 to 314 are turned off. Subsequently, when the temperature of the panel is sufficiently decreased, the vacuum sources of the pin chucks 211 to 214 are switched off, and the ring burners 311 to 314 and the pin chucks 211 to 214 are replaced to the position shown by broken lines in FIG. 2 by operating the cylinders 26.

In the above manner, three to four metal pins for the attachment of a shadow mask are embedded in and on the inside of the skirt section of the glass panel 39 for a shadow mask type color television cathode-ray tube. In the figure, the numeral 49 designates a cover to prevent heat from escaping to the outside, because the operation of embedding the metal pins in the glass panel should be done in the burner-heated high-temperature atmosphere.

As has been described in the foregoing, the apparatus according to the invention has the effects that it is possible to automatically carry out the operation of simultaneously embedding a plurality of metal pins, which has heretofore been done by the manual operation (it is desirable to reduce the manual operation as much as possible, as the process is carried out in the atmosphere at a considerably high temperature), thus outstandingly improving the operational efficiency. Also, as the pin chuck and the concentric ring burner may be moved independently of each other, the glass panel and the metal pin may be separately heated to respective suitable temperatures to the effect that an ideal condition for embedding the metal pins in the glass panel may be obtained. Further, by using the foregoing ring cam mechanism precise centering of the glass panel may be accomplished to eventually attain precise position and uniform strength of embedding of the embedded metal pins.

Typical examples of a metal pin used for mounting a shadow mask on a glass panel used in a prior art shadow mask type color tube of this nature include a metal pin of entirely non-hollow type and a metal pin 61 having a ring-shaped projection 60 at its end to be embedded in the glass panel as shown in FIG. 6.

However, the metal pin of the former type has a relatively small effective contacting area at its portion to be embedded in the glass panel. Further, when the pin is forcedly embedded into a predetermined wall surface of the panel which is kept softened by preliminary heating, it tends to form a depression in the panel in the neighborhood of a portion of the pin to be embedded therein thus reducing the supporting strength of the pin with the result that such a crack as is mentioned above tends to be disadvantageously produced.

In contrast, said latter metal pin 61 in which a ring-shaped projection 60 is formed at its end to be embedded in the glass panel has a greatly increased effective contact area at its portion to be embedded, as compared with said non-hollow type pin. In addition, when the pin 61 is forcedly embedded, at its side including the ring-shaped projection 60, into a predetermined wall surface of the glass panel preliminarily heated and softened to a predetermined temperature, a temporary depression will be formed in the panel at its portion surrounding the embedded portion of the pin. The pin 61, however, is moved backwardly to a certain extent in a direction opposite to that of forced embedment owing to the expansion of the air remaining in the projection 60, so that such a temporary depression will be recovered toward the wall surface of the panel while keeping its integral connection with the pin 61, with the result that the supporting strength of the embedded portion of the pin can be greatly improved when compared with the pin of the former type.

However, since the metal pin 61 of the latter type when embedded in the glass panel 63 is moved in a direction opposite to that of forced embedding due to the expansion of the air present in the ring-shaped projection 60, not only the affinity between the metal pin and the glass panel is degraded and the depth of embedment of the pin tends to be non-uniform, but also the air present in the ring-shaped projection 60 tends to still remain therein without being completely discharged, whereby the contact area of the pin substantially effective to the panel is disadvantageously decreased. Thus, such a metal pin is not completely satisfactory in terms of the supporting strength at the embossed portion.

Further, the metal pin 61 of the above described arrangement requires a considerably strong compression force in the embedding operation thereof to compensate for a repulsive force generated by the air present in the ring-shaped projection 60 and which acts against the pressing force for embedding the pin into the panel, and compression force tends to form a curved portion 64 on the panel which extends outwardly therefrom.

Accordingly this invention employs a metal pin 70 (or 80) as shown in FIGS. 7A and 7B or 8A and 8B which has been improved over the metal pin of the arrangement described above and having the ring-shaped projection. The metal pin 70 comprises a non-hollow portion 71 at its end to which a shadow mask is to be connected, and a ring-shaped projection 72 formed at the other end to be embedded into a glass panel for a shadow mask type color tube and made integral with the non-hollow portion 71. In the ring-shaped portion 72 are formed a plurality of approximately equally angularly spaced notches 73, four such notches angularly spaced apart at about 90 degrees being illustrated in FIG. 7A.

When the ring-shaped projection 72 having the notches 73 is embedded into a predetermined inner wall surface of a skirt portion of the glass panel, the air present in the projection 72 will be gradually completely discharged through the notches 73, as an amount of heated and softened glass is fed into the projection 72, so that the substantial contact area of the pin effective on the panel will be further increased as compared with the one described in connection with FIG. 6. In addition, since the air present can be externally discharged without being expanded, the pin 70 may be substantially maintained in its originally embedded position.

Further, the compression force required for forced embedment of the pin can be further reduced thereby giving rise to no unnecessary deformation on the glass panel.

If the width of the notches 73 is too great, there will be the danger of heated and softened glass flowing out therethrough and thereby forming a crack in the panel in the neighborhood of the embedded portion of the pins. Although the width $d$ of the notch 73 should vary depending upon the viscosity of the heated and softened glass, it is preferred to form said width to less than 2 mm. for the purpose of avoiding flow out of the glass in view of the fact that the viscosity of a glass panel heated to 1100° C. to 1200° C. focus in a shadow mask type color tube is usually of the order of $1 \times 10^2 - 1 \times 10^3$ poises. The embedment of the pin into the panel may be further strengthened by causing the ring-shaped projection 72 of the pin 70 to be tapered in such a manner that the forward end thereof has a reduced diameter as shown.

Figure 8A:
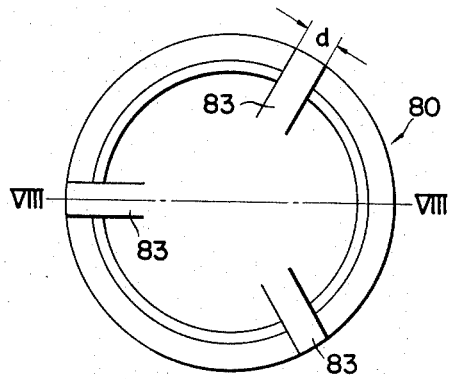
FIG. 8A is a plan view of another embodiment of the glass pin according to the invention.
Figure 8B:
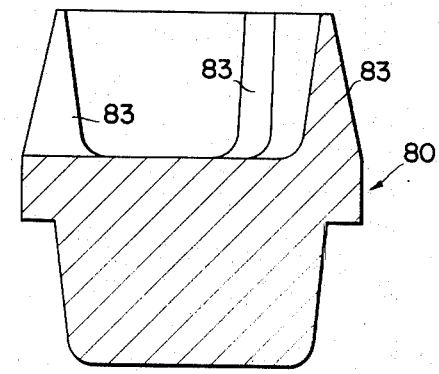
FIG. 8B is a section taken along line VIII—VIII of FIG. 8A.

In a modification shown in FIGS. 8A and 8B the number of the notches 83 is shown to be three rather than four as in the foregoing embodiment. It should be appreciated, however, that the number thereof is not restricted thereto but may be more than five.

Notches formed in the ring-shaped projection have been described above to provide means for externally discharging the air present in said projection at the time of embedment of the pin.

It will be apparent, however, that similar advantages may be obtained by forming openings in the metal pin in such a manner that it penetrates from the bottom surface of the ring-shaped projection outwardly through the non-hollow porton thereof.

What I claim is:

1. An apparatus for embedding metal pins in a glass panel of a predetermined size having a skirt portion formed substantially vertically at least on the outer periphery thereof, with a plurality of metal pins having one end embedded into the inner wall surface of said skirt portion for mounting another member on the inner wall surface of the skirt portion, comprising: a base frame formed sufficiently larger in size than said glass panel and having a surface upon which the embedment of said metal pins into said glass panel is carried out, a plurality of first pin chuck means selectively rotatable to lie substantially in a predetermined horizontal position and other positions respectively outwardly of a setting portion on said base frame of said glass panel, and which are positioned so as to securely carry each said one end of the metal pin by subjecting each of forward ends thereof to selective energization by a vacuum source, a plurality of second pin chuck means located approximately in line with each of said first pin chuck means when each said first pin chuck means is rotated to the horizontal position, which are capable of receiving and securely carrying each of the opposite ends of each said metal pins from each said first pin chuck means by subjecting the forward ends thereof to selective energization by the vacuum source, said opposite end being mounted by said other member, and which are movable in back and forth directions, and a plurality of heating sources provided about the forward end of each said second pin chuck means.

2. The apparatus for embedding metal pins in a glass panel as claimed in claim 1 wherein said glass panel is a glass panel for use in a shadow mask type color tube and which has a skirt portion for mounting a shadow mask on the inner wall surface thereof.

3. The apparatus for embedding metal pins in a glass panel as claimed in claim 1 wherein one end of each said metal pin to be at least embedded into said glass panel is formed of a ring-shaped projection having therein a plurality of notches.

4. The apparatus for embedding metal pins in a glass panel as claimed in claim 1 wherein said base frame includes a plurality of support members for supporting the surface of said glass panel on the set portion of said glass panel.

5. The apparatus for embedding metal pins in a glass panel as claimed in claim 1 wherein said face comprises a ring cam mechanism positioned on a circumference interconnecting the inner wall surfaces of the skirt portion of said glass panel, and which is adjustably rotatable in two opposite directions.

6. The apparatus for embedding metal pins in a glass panel as claimed in claim 1 wherein said plurality of heating sources are ring burners.

7. The apparatus for embedding metal pins in a glass panel as claimed in claim 1 wherein said plurality of heating sources are positioned to be independently movable in the same direction as said second pin chuck means.

8. The apparatus for embedding metal pins in a glass panel as claimed in claim 3 wherein each said ring-shaped projection is forwardly tapered.

9. The apparatus for embedding metal pins in a glass panel as claimed in claim 3 wherein the width of each said metal pin is less than 2 mm.

10. The apparatus for embedding metal pins in a glass panel as claimed in claim 5 wherein said ring cam mechanism includes a plurality of press rollers for regulating the set position of the glass panel capable of being forcedly pressed against and removed from the inner wall surfaces of the skirt portion of the glass panel by said adjustment of rotation.

References Cited
UNITED STATES PATENTS

| | | | |
|---|---|---|---|
| 2,485,769 | 10/1949 | Phelps | 65—154 X |
| 3,021,643 | 2/1962 | Blanding et al. | 65—154 |
| 3,493,358 | 2/1970 | Carstensen et al. | 65—154 |
| 3,497,339 | 2/1970 | Eastus | 65—154 X |

ARTHUR D. KELLOGG, Primary Examiner

U.S. Cl. X.R.

65—146, 155